United States Patent [19]

Kimoto et al.

[11] Patent Number: 4,979,162
[45] Date of Patent: Dec. 18, 1990

[54] APPARATUS FOR DETECTING THE SECONDARY DISTORTION OF OPTICAL TYPE RECORDED INFORMATION

[75] Inventors: Kiyoshi Kimoto, Machida; Shinichi Tanaka, Kamakura, both of Japan

[73] Assignee: Nikon Corporation, Tokyo, Japan

[21] Appl. No.: 379,224

[22] Filed: Jul. 13, 1989

Related U.S. Application Data

[63] Continuation-in-part of Ser. No. 346,400, May 2, 1989, abandoned, which is a continuation of Ser. No. 142,209, Jan. 11, 1988, abandoned.

[30] Foreign Application Priority Data

Jan. 16, 1987 [JP] Japan .................................. 62-7734
Jul. 18, 1988 [JP] Japan ................................ 63-178478

[51] Int. Cl.$^5$ .............................................. G11B 7/00
[52] U.S. Cl. .................................... 369/116; 369/50; 369/107; 346/76 L
[58] Field of Search ............. 346/108, 76 L; 358/342; 369/53-58, 47, 50-100, 107-109, 116-121

[56] References Cited

U.S. PATENT DOCUMENTS

| | | | |
|---|---|---|---|
| 4,225,873 | 9/1980 | Winslow | 369/116 X |
| 4,380,015 | 4/1983 | Ito et al. | 369/116 X |
| 4,456,914 | 6/1984 | Winslow | 369/116 X |
| 4,488,277 | 12/1984 | McFarlane et al. | 369/116 |
| 4,561,032 | 12/1985 | Matsumoto et al. | 360/114 |
| 4,616,356 | 10/1986 | Wilkinson et al. | 369/116 |

Primary Examiner—Robert L. Richardson
Attorney, Agent, or Firm—Shapiro and Shapiro

[57] ABSTRACT

An apparatus for recording information on an optical type recording medium alternately generates a binary signal of a first frequency and a binary signal of a second frequency lower than the first frequency, applies radiation to the medium and writes the binary signals of the first frequency and the second frequency into the medium, reproduces the binary signals of the first frequency and the second frequency written into the medium and converts them to electrical signals, AC-amplifies the electrical signals, detects the difference between the amplitude of the output of the AC amplifier of a level higher than a reference level, which corresponds to the first frequency and of a level lower than the reference level, which corresponds to the first frequency and outputs a detection signal, and responds to the detection signal to control the intensity of the radiation applied to the medium for writing.

25 Claims, 8 Drawing Sheets

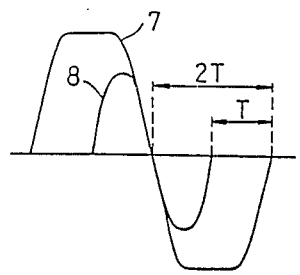
FIG. 4
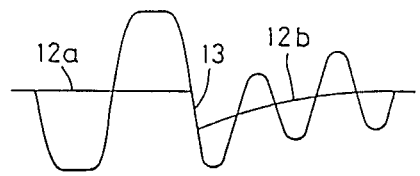
FIG. 5
FIG. 7a  FIG. 6a
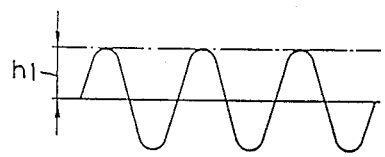 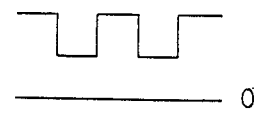
FIG. 7b  FIG. 6b
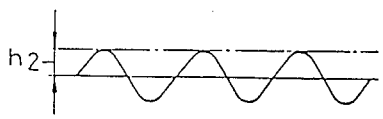 

FIG. 8
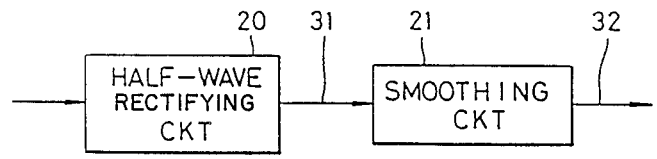
FIG. 9a
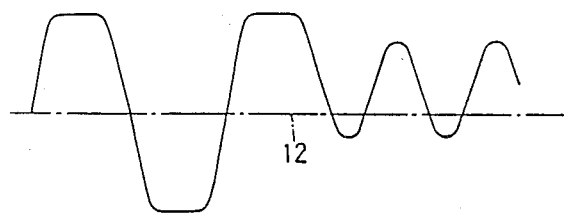
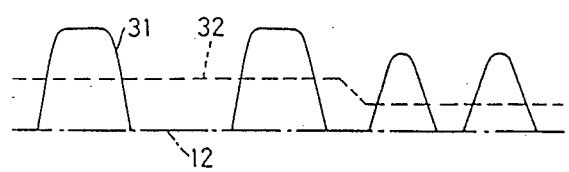
FIG. 9b

DUTY RATIO = 50%

DUTY RATIO ≠ 50%

APPARATUS FOR DETECTING THE SECONDARY DISTORTION OF OPTICAL TYPE RECORDED INFORMATION

This application is a continuation-in-part of Ser. No. 346,400, filed May 2, 1989 now abandoned, which is a continuation of Ser. No. 142,209, filed Jan. 11, 1988, now abandoned.

BACKGROUND OF THE INVENTION

1. Field of the Invention

This invention relates to a method of and an apparatus for detecting the secondary distortion of optical type recorded information, that is, detecting the presence of secondary distortion contained in the information recorded on a recording medium such as an optical disc or a magneto-optical disc.

2. Related Background Art

When information is to be recorded in the form of a recording pit comprising a mechanical uneven configuration on an optical disc by the application of a laser beam based on recording information, or when information is to be recorded in the form of a recording bit by the vertical direction of magnetization on a magneto-optical disc, a binary signal whose duty ratio is 50% has heretofore been recorded to obtain a proper laser driving power, the laser power has been calibrated so that the duty ratio of the recorded information recorded on the medium is 50%, so that the recorded information contains no secondary distortion, and recording has been effected by the calibrated laser power.

Now, a spectrum analyzer is usually used for the measurement of secondary distortion contained in the information recorded on an optical disc. That is, the recorded information of the optical disc is optically read by a reading head and converted to an electrical signal, and the information reproducing signal obtained from the reading head is analyzed by the spectrum analyzer.

When the analysis of the recorded information has been effected by such spectrum analyzer, in the case of an ideal recording signal whose duty ratio is 50% the result of the measurement of the recorded information by the spectrum analyzer is such that, as shown in FIG. 12A of the accompanying drawings, spectral components of only odd orders such as 3fs, 5fs, ... are obtained for the recording frequency (basic frequency) fs.

On the other hand, when the duty ratio of the recording signal is smaller or greater than 50%, the result of the measurement by the spectrum analyzer is as shown in FIG. 12B of the accompanying drawings, and in this case, spectral components of even orders such as 2fs, 3fs, 4fs, ... also occur for the recording frequency fs, and this secondary spectral component which is 2fs is called secondary distortion.

However, in the conventional secondary distortion detecting method using a spectrum analyzer, it has been difficult, for the following reasons, to automatically control the laser power which provides a recording signal so that, secondary distortion may not occur, that is, so that the duty ratio of recorded information may be kept at 50%.

Firstly, in the result of the measurement by the spectrum analyzer, even if the duty ratio of the recording signal is smaller than 50% or conversely greater than 50% there appears a secondary spectral component representing the secondary distortion as shown in FIG. 12B, and the polarity thereof cannot be detected. Accordingly, even if the secondary distortion can be detected, in which direction the duty ratio of the recording signal deviates relative to the 50% duty ratio for which no secondary distortion occurs cannot be known and thus, judgment as to whether an increase or decrease in the laser power is required is not possible.

Secondly, when the recording frequency is low, that is, when the recording bit is large, there is the problem that the detection accuracy of the secondary spectral component by the spectrum analyzer is reduced, and this has led to the necessity of increasing the recording frequency fs.

However, if the recording frequency becomes high to a certain extent, it becomes impossible due to the MTF (modulation transfer function) frequency characteristic of the reading optical system to detect the secondary spectral component. MTF refers to the frequency characteristic of the sensitivity with which the optical system detects the recorded information, and it is the characteristic shown in FIG. 13 of the accompanying drawings. As is apparent from FIG. 13, if the recording frequency fs is made high to a certain extent as shown, MTF becomes zero at 2fs which provides the secondary spectral component, and the signal of 2fs cannot be detected.

SUMMARY OF THE INVENTION

It is an object of the present invention to provide a method of and an apparatus for detecting secondary distortion of optically recorded information, for example, secondary distortion contained in the recorded information of a recording medium such as an optical disc or the like, and also for detecting the polarity of the secondary distortion, that is, in which direction the duty ratio of the recording signal which has caused the secondary distortion deviates relative to the 50% duty ratio.

To achieve this object, in the present invention, an optical information reproducing signal from the recording region of a recording medium, on which information bits of a predetermined 50% duty ratio are alternately recorded by two different frequencies, is AC-amplified, and is individually envelope-detected above (the plus side) and below (the minus side) the amplitude center level. The envelope detection outputs are passed through a band-pass filter to extract their amplitude components, whereafter the amplitude peak values thereof are detected. When the detected peak values are equal, it is judged that there is no secondary distortion for the 50% duty ratio, and when the detected peak values differ from each other, it is judged that there is secondary distortion.

Further, when it is judged that there is secondary distortion and when the first detected peak value based on the upper envelope detection output is greater than the second detected peak value based on the lower envelope detection output, it is judged that the duty ratio of the recording signal is smaller than 50%, while in the converse case, it is judged that the duty ratio of the recording signal is greater than 50%.

According to such a construction of the present invention, an information reproducing signal of a low frequency and an information reproducing signal of a high frequency are alternately obtained in the optical reading of recorded information, and dependent on of the MTF frequency characteristic of the reading optical system, there are alternately produced reproducing signals which are great in reproducing level for a low frequency and low in reproducing level for a high frequency, depending on the magnitude of the frequency.

Also, considering the variation in duty ratio of the reproducing signal, with regard to the amount of fluctuation of the same information bit, for example, or the same variation in diameter of information pits of different diameters in accordance with the magnitude of the frequency, the variation in the duty ratio of the reproducing signal of a large information pit (low frequency) is small, and conversely, the variation in the duty ratio of the reproducing signal of a small information pit (high frequency) is great. So, with the reproducing signal obtained from an information bit of a low frequency having a small variation in the duty ratio as a reference, the fluctuation attributable to the secondary distortion of the reproducing signal obtained from an information bit of a high frequency having a great variation in the duty ratio is detected.

Further, for the variation from the 50% duty ratio, there is little or no variation in the level of the information reproducing signal of a low frequency which provides the reference, while with regard to the information reproducing signal of a high frequency, a decrease in the duty ratio results in a decrease in the DC component and conversely, an increase in the duty ratio results in an increase in the DC component. Therefore, using the amplitude center level of the information reproducing signal of a low frequency as a reference, the information reproducing signal of a high frequency causes a downward level change for a decrease in the duty ratio and causes an upward change for an increase in the duty ratio.

So, in the present invention, the reproducing signal after it is passed through an alternating-current coupling, is divided above and below the amplitude center level and individually envelope-detected so that the reproducing signal can shift relative to the amplitude center level dependent on of the duty ratio.

Between the upper and lower detection signals provided by this envelope detection, there is created such a relation that if the duty ratio is 50%, their amplitude components are equal and if the duty ratio becomes smaller, the amplitude component of the upper detection signal becomes greater than the amplitude component of the lower detection signal and further, if the duty ratio becomes greater, the amplitude component of the upper detection signal becomes smaller than the amplitude component of the lower detection signal.

Therefore, the design is such that by the envelope detection outputs being passed through a bandpass filter, their amplitude components are extracted and made into sine waves, whereafter the amplitude peak values thereof are detected and from the comparison between the magnitudes of these detected peak values, the presence of secondary distortion and the relative magnitude for the 50% duty ratio when secondary distortion has occurred are judged.

BRIEF DESCRIPTION OF THE DRAWINGS

FIG. 4 is a signal waveform illustration showing the variation in the level of the reproducing signal by the MTF frequency characteristic of a reading optical system.

FIG. 5 is a signal waveform illustration showing the sag of the reproducing signal caused by the difference between DC components.

FIGS. 6(a)-(b) are waveform illustrations of the envelope detection signals of FIG. 1.

FIGS. 7(a)-(b) are signal waveform illustrations showing the output of the band-pass filter of FIG. 1.

FIG. 8 is a block diagram showing an improved example of an envelope detecting circuit.

FIGS. 9(a)-(b) are signal waveform illustrations in FIG. 8.

DESCRIPTION OF THE PREFERRED EMBODIMENTS

Figure 1:
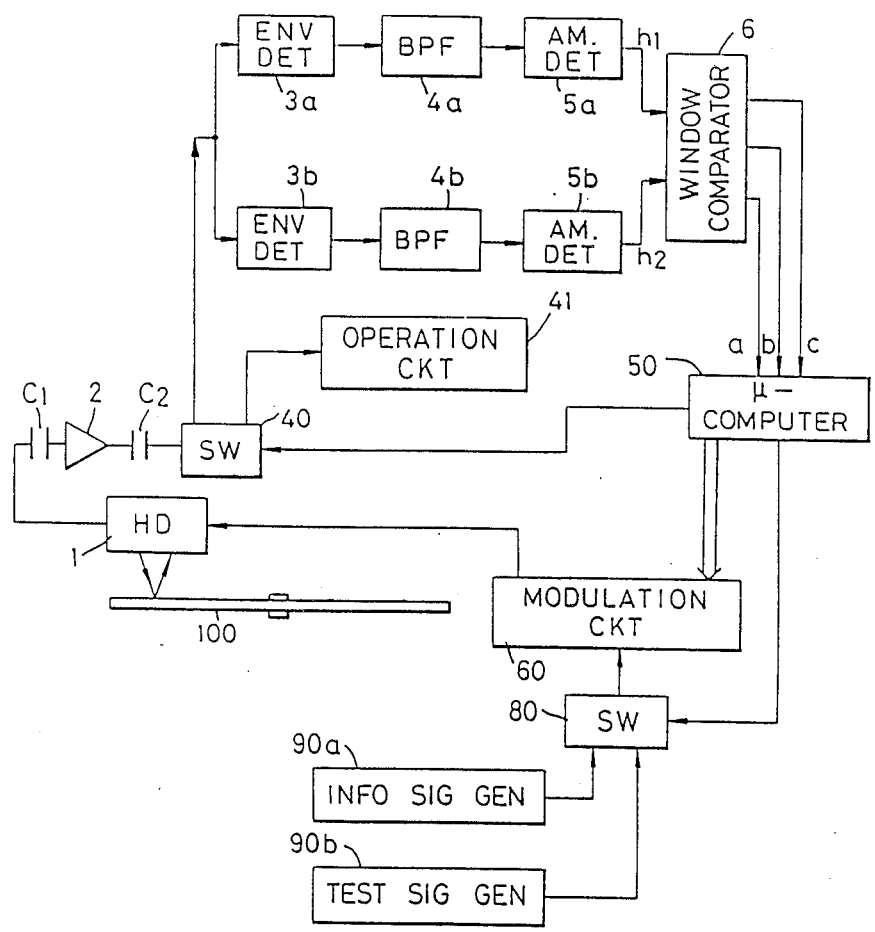
FIG. 1 is a block diagram showing an embodiment of the present invention.

FIG. 1 is a block diagram showing an embodiment of the present invention.

The construction will first be described. A head 1 is provided with a laser light source for applying radiation to an optical disc 100, and a photoelectric detecting device for detecting radiation from the disc 100. The head applies a laser beam to the optical disc 100, serving as a recording medium, to record information thereon, and also applies a laser beam to the disc 100, on which information has been recorded, to thereby optically read the recorded information written on the disc 100 from radiation from the disc 100. A photoelectric device converts radiation from the disc to an electrical signal, and outputs an information reproducing signal. A device which serves to record and reproduce signals like this head 1 is shown, for example, in U.S. Pat. No. 4,561,032.

A microcomputer 50 controls a modulation circuit 60, whereby the electric power supplied to the head 1 containing the laser light source therein is regulated, and an information bit is written into the optical disc 100. The laser light source in the head 1 alternately records information bits having two different frequencies on the disc 100 during each of equal period so that the duty ratio is 50%. When secondary distortion is to be detected, the information bits having the two different frequencies that have been alternately recorded during each of equal periods is reproduced by the photoelectric converting device in the head 1.

Figure 2A:
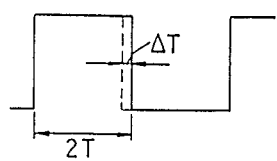
FIGS. 2A and 2B illustrate two recording signals of different frequencies which are the subject of secondary distortion detection.
Figure 2B:
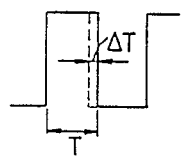

The information bits recorded on the optical disc 100 to detect secondary distortion will now be described specifically. For example, a recording signal of low frequency shown in FIG. 2A and a recording signal of high frequency shown in FIG. 2B are recorded. When the bit length of the signal of high frequency shown in FIG. 2B is T, the bit length of the signal of low frequency shown in FIG. 2A is set to 2T. Of course, the duty ratios of the respective recording signals having the bit lengths 2T and T are intended to be 50%, but fluctuation of the duty ratios occurs, as indicated by broken lines, due to irregularity of the intensity of the laser light which provides the recording signals. Assuming that the fluctuation $\Delta T$ of the same bit length has occurred in the two recording signals having the bit lengths 2T and T, the duty ratio of the signal of low frequency having the bit length 2T changes little as compared with the duty ratio of the signal of high frequency having the bit length T. Accordingly, the duty ratio of the recording signal of low frequency having the bit length 2T is maintained substantially at the 50% duty ratio even if more or less signal distortion is produced, and in the detection of the secondary distortion which will be clarified in the ensuing description, the recording signal of low frequency having the bit length 2T is used as a reference signal.

Turning back to FIG. 1, the information reproducing signal for the detection of the secondary distortion read by the head 1 is input to an amplifier 2 by alternating-current coupling capacitor C1 and is AC-amplified by the amplifier 2, whereafter it is input to envelope detecting circuits 3a and 3b through alternating-current coupling capacitor C2 and a switch circuit 40.

The microcomputer 50 causes the switch circuit 40 to direct the output from the capacitor C2 to an operation circuit 41 when the output from an information signal generator 90a is selected by a switch circuit 80. The operation circuit 41 compares the output from the capacitor C2 with a predetermined level and converts it to a binary signal. The deformation of the waveform of the reproducing signal from the disc 100 by the secondary distortion gives rise to a variation in the duty ratio during conversion to the binary signal.

The envelope detecting circuit 3a envelope-detects the information reproducing signal obtained from the amplifier 2 above the amplitude center level, while the envelope detecting circuit 3b envelope-detects the information reproducing signal below the amplitude center level.

The outputs of the envelope detecting circuits 3a and 3b are imparted to band-pass filters 4a and 4b, respectively, in which the amplitude components of the envelope detection outputs are extracted and at the same time, are converted to sine wave signals.

The outputs of the band-pass filters 4a and 4b are imparted to amplitude detecting circuits 5a and 5b, respectively, which detect the amplitude peak values in the amplitude components of the envelope detection signals passed through the band-pass filters 4a and 4b.

The outputs of the amplitude detecting circuits 5a and 5b are imparted to a conventional window comparator 6 as judging means for judging the degree of the secondary distortion contained in the information reproducing signal on the basis of the magnitudes of the detected peak values. When the amplitude peak value detected by the amplitude detecting circuit 5a is h1 and the amplitude peak value detected by the amplitude detecting circuit 5b is h2, the window comparator 6 performs the following judging operations on the basis of these amplitude peak values h1 and h2:

(a) When h1=h2:
It judges that the duty ratio of the information reproducing signal is 50% and this signal contains no secondary distortion.

(b) When h1>h2:
It judges that the duty ratio of the information reproducing signal is less than 50% and there is secondary distortion.

(c) When h1<h2:
It judges that the duty ratio of the information reproducing signal is greater than 50% and there is secondary distortion.

The window comparator 6 puts out one of corresponding outputs a, b and c under the above-mentioned judgment conditions (a)-(c) on the basis of the detected peak values h1 and h2 from the amplitude detecting circuits 5a and 5b. When the power supplied to the laser light source of the head 1 is to be controlled on the basis of the output of the window comparator 6 to adjust the intensity of the laser light, the microcomputer 50 maintains the intensity of the laser light at the existing value when the optimum output a is obtained, because the duty ratio of the recording signal is 50%; and raises the intensity of the laser light to control the duty ratio of the recording signal to 50%, for which the optimum output a is obtained, when the judgment output b is obtained, because the duty ratio of the recording signal is small; and reduces the intensity of the laser power to control the duty ratio of the recording signal so that the optimum output a is obtained when the judgment output c is obtained, because the duty ratio of the recording signal is greater than 50%. An information signal generator 90a is means for generating a signal to be written into the disc after the secondary distortion has been detected and the electric power to the laser light source has been adjusted, and a test signal generator 90b is means for generating a signal shown in FIG. 3(a) for detecting the secondary distortion. The switch circuit 80 directs the signal of one of the generators 90a and 90b to the modulation circuit 60 in response to the output from the microcomputer 50.

Operation of the embodiment of FIG. 1 will now be described.

A recording signal of the bit length 2T (low frequency) and a recording signal of the bit length T (high frequency) shown in FIG. 2 are alternately recorded at a predetermined interval on the optical disc 100, and it is to be understood that, as shown, for example, in FIG. 3(a), two signals of the bit length T are recorded subsequently to a recording signal of the bit length 2T.

Figure 13:
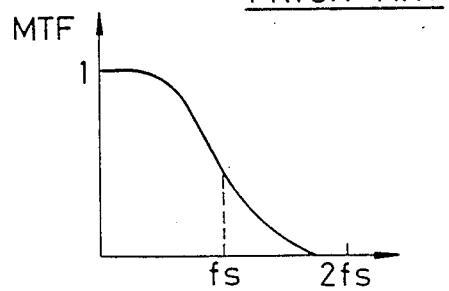
FIG. 13 is a graph showing the MTF frequency characteristic of the reading optical system.

When information bit comprising two different frequencies thus recorded on the optical disc 100 are reproduced by the head 1 to obtain information reproducing signals, the reproducing signal level differs between the reproducing signal of the bit length 2T and the reproducing signal of the bit length T due to the detection sensitivity of the reading optical system of the head 1 shown in FIG. 13, namely, the MTF characteristic relative to the recording frequency.

That is, since the recording frequency of the bit length 2T is low, the value of MTF is great as is apparent from the MTF frequency characteristic of FIG. 13, and as a result, the information reproducing signal from the recording bit of the bit length 2T becomes high in its reproduction level as indicated by the signal 7 of FIG. 4. In contrast, the frequency of the recording signal of the bit length T is high and therefore, the value of MTF in FIG. 13 becomes small, and as indicated by the signal 8 of FIG. 4, the reproduction level becomes low relative to the reproducing signal 7 of the bit length 2T and further, as regards the reproducing signal of the bit length T, signal 8 becomes substantially a sine wave because no signal of frequency component as high as at least twice the basic frequency can be detected from the optical system.

A description will now be given of FIG. 3. A signal of period T when alternating-current coupling is not used has its waveform deformed by secondary distortion and therefore, the center of amplitude thereof is varied by a varying direct current component, but here, alternating-current coupling is used and therefore, the center of amplitude is hardly varied even if the waveform is deformed by secondary distortion. Also, a signal of period 2T when alternating-current coupling is not used has its waveform hardly deformed by secondary distortion and therefore, the center of amplitude thereof is also hardly varied. However, when alternating-current coupling is used, a signal of period T has its center of amplitude hardly varied even if its waveform is deformed by secondary distortion. Where alternating-current coupling is used and a signal of period T and a signal of period 2T as shown in FIGS. 3(b), (c) and (d) appear alternately, the centers of amplitude of the signal of period T and the signal of period 2T coincide with each other if there is no secondary distortion, but the centers of amplitude of the signal of period T and the signal of period 2T deviate from each other if there is secondary distortion.

Figure 3A:
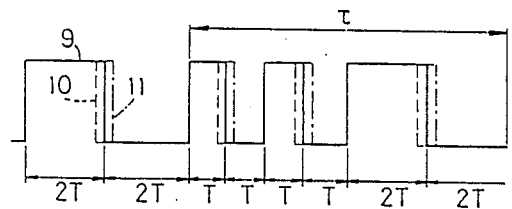
FIGS. 3(a)-(d) are signal waveform illustrations showing the information reproducing signal when the duty ratio of the recording signal is 50%, smaller than 50% and greater than 50%.
Figure 3B:
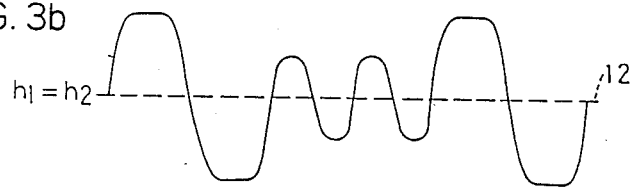

Due to the MTF frequency characteristic in the reading optical system of the head 1, the information reproducing signal of the information bit recorded at the 50% duty ratio as indicated by solid line 9 of FIG. 3(a) assumes a signal waveform shown in FIG. 3(b). The signal waveform at the 50% duty ratio is a reproducing signal waveform vertically symmetrical relative to the center level 12 with respect to either of the signal of the bit length 2T and the signal of the bit length T.

Figure 3C:
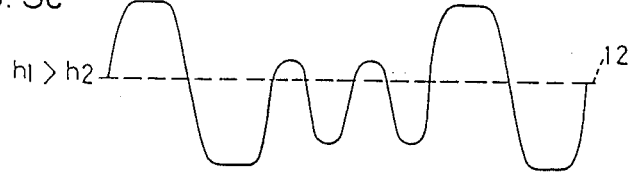

Now, the information reproducing signal from the information bit recorded by a recording signal 10 indicated by dotted line in FIG. 3(a) whose duty ratio is smaller than 50% is such as shown in FIG. 3(c). That is, the reproducing signal of the bit length 2T is hardly affected by the fluctuation of the duty ratio and therefore assumes a waveform vertically symmetrical about the center level 12, while the reproducing signal of the bit length T becomes smaller in duty ratio than 50% and therefore assumes a waveform in which the DC component is decreased and the amplitude component above the center level 12 is decreased and at the same time, the amplitude component below the center level 12 is increased.

Figure 3D:
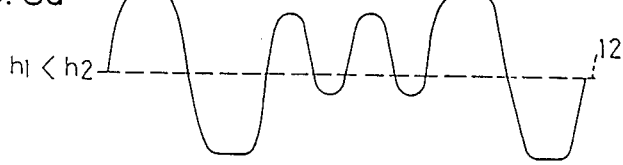

Further, the information reproducing signal of the information bit recorded by a recording signal 11 whose duty ratio is greater than 50% as indicated by dot-and-dash line in FIG. 3(a) is such as shown in FIG. 3(d). That is, the reproducing signal of the bit length 2T suffers little from the fluctuation caused by the increase in duty ratio and therefore assumes a waveform vertically substantially symmetrical about the center level 12, while the reproducing signal of the bit length T is increased in DC component by the increase in duty ratio and the amplitude above the center level 12 is increased and the amplitude below the center level 12 is decreased.

Actually, as shown in FIG. 1, alternating-current coupling is used by virtue of the capacitors C1 and C2 and therefore, when the magnitudes of the DC components of the reproducing signal of the bit length 2T and the reproducing signal of the bit length T differ from each other, there is produced a sag 13 between the center level 12a of the reproducing signal of the bit length 2T and the center level 12b of the reproducing signal of the bit length T, as shown in FIG. 5. Detection must be effected while such sag is produced. Accordingly, the period τ at which the signal of the bit length 2T and the signal of the bit length T are recorded cannot be made very great. In the present embodiment, the time during which the signal of the bit length T2 is recorded and the time during which the signal of the bit length T is recorded are set equal (τ/2 each), so that the final detection signal can be reliably effected. However, these times need not always be equal to each other.

Detection of the secondary distortion of the information reproducing signal thus reproduced through the reading optical system of the head 1 will now be described specifically with respect, for example, to the information reproducing signal when the duty ratio is smaller than 50% as shown in FIG. 3(c).

The information reproducing signal when the duty ratio reproduced by the head 1 is smaller than 50% is AC-amplified by the amplifier 2, whereafter it is imparted to the envelope detecting circuits 3a and 3b. The envelope detecting circuit 3a produces the detection output of the upper envelope shown in FIG. 6(a), while the envelope detecting circuit 3b produces the detection output of the lower envelope shown in FIG. 6(b).

In the upper and lower envelope detection signals shown in FIG. 6, the portion in which the amplitude is great represents the reproducing signal of the bit length 2T, and the portion in which the amplitude component is small represents the reproducing signal of the bit length T.

The upper and lower envelope detection signals envelope-detected by the envelope detecting circuits 3a and 3b are input to the band-pass filters 4a and 4b. The central frequency fc of the band-pass filters 4a and 4b is set to $fc = 1/\tau$, and the upper envelope detection signal shown in FIG. 6(a) which has passed through the band-pass filter 4a becomes a signal from which the amplitude component shown in FIG. 7(a) has been extracted and converted to a sine wave, while the lower envelope detection signal shown in FIG. 6(b) becomes a signal from which the amplitude component has been extracted as shown in FIG. 7(b) and converted to a sine wave.

The amplitude component of the upper envelope detection output and the amplitude component of the lower envelope detection signal shown in FIGS. 7(a) and (b) which have been obtained by passing through the band-pass filters 4a and 4b have their amplitude peak values h1 and h2 detected in the amplitude detecting circuits 5a and 5b, and the presence of secondary distortion is detected and the deviation of the duty ratio from 50% is judged in the window comparator 6 on the basis of the relation of magnitude between the detected peak values h1 and h2.

That is, in the case of FIG. 7, h1 > h2 and thus, the judgment output b that there is secondary distortion and that the duty ratio is smaller than 50% is produced.

Of course, when the duty ratio is greater than 50% as shown in FIG. 3(d), the detected peak values h1 and h2 obtained from the amplitude detecting circuits 5a and 5b are h1<h2 and therefore, the window comparator 6 judges that there is secondary distortion and at the same time, produces the judgment output c that the duty ratio is greater than 50%. Further, when the duty ratio is 50%, h1=h2 and at such time, the window comparator 6 produces the optimum output a.

The above embodiment has been described with respect to information reproducing signals comprising information bits of the bit length 2T and the bit length T recorded on the optical disc, but the greater is the difference between two types of recorded bit information of different frequencies, the better is the detection accuracy of secondary distortion and therefore, it is desirable to make the difference between the bit lengths of recording signals of different frequencies great within the range of the MTF frequency characteristic shown in FIG. 13. Accordingly, for example, signals of period T and signals of period 3T or 4T may be alternately recorded on the disc. Further, depending on the MTF frequency characteristic of the optical system, when the difference between the reproducing signal levels of a high frequency signal and a low frequency signal is small, if the difference between the reproducing signal levels of the high frequency portion and the low frequency portion is made great by a low-pass filter before the information reproducing signals are envelope-detected, detection of secondary distortion will become easy.

Also, the above embodiment has been described with respect to an example in which the laser power which provides the recording signals is controlled on the basis of the detection of secondary distortion, but the present invention is not restricted thereto. It may be used for mere detection of secondary distortion and measurement of the duty ratio, or may be designed to effect suitable automatic control based on the detection output of the secondary distortion or the duty ratio.

The above embodiment has been shown as an example in which the outputs of the envelope detecting circuits 3a and 3b are passed through the band-pass filters 4a and 4b, whereafter the amplitudes thereof are detected by the amplitude detecting circuits 5a and 5b and the difference between the amplitudes is judged by the window comparator 6, but the present invention is not restricted thereto. It may be designed such that for example, the output of a half-wave rectifying circuit is smoothed by a capacitor and DC levels are compared and determined.

FIG. 8 shows an example in which the envelope detecting circuit in FIG. 1 is comprised of a half-wave rectifying circuit 20 and a smoothing circuit 21, and FIG. 9 shows the signal waveforms in the various portions of these circuits. The reference numeral 12 designates the amplitude center level of the signal, the reference numeral 31 denotes the output waveform of the half-wave rectifying circuit 20, and the reference numeral 32 designates the output waveform of the smoothing circuit 21.

Figure 10:
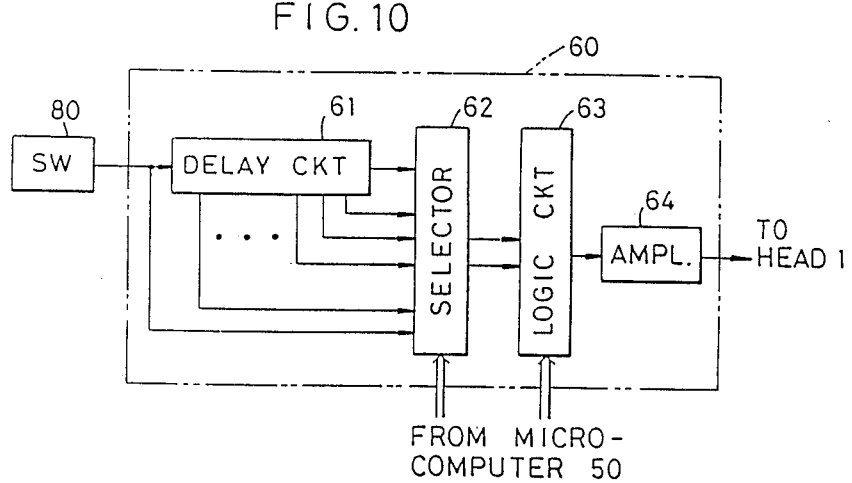
FIG. 10 is a block diagram showing another embodiment of the modulation circuit shown in FIG. 1.

In FIG. 1, adjustment of the duty ratio when signals are written into the disc 100 has been accomplished by increasing or decreasing the electric power supplied to the laser light source, but a similar purpose can also be achieved by adjusting the duty ratio of the signal to the laser light source as shown in FIGS. 10 and 11.

Figure 11A:
FIGS. 11(a)-(d) are waveform illustrations showing operation of the FIG. 10 embodiment.
Figure 11B:
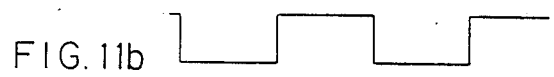
Figure 11C:
Figure 11D:
Figure 12A:
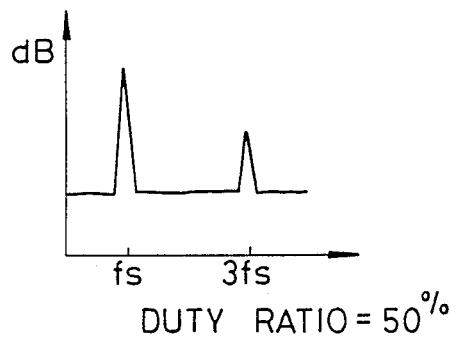
FIGS. 12A and 12B are spectral distribution graphs showing the spectral components for the basic frequency obtained by a conventional spectrum analyzer.
Figure 12B:
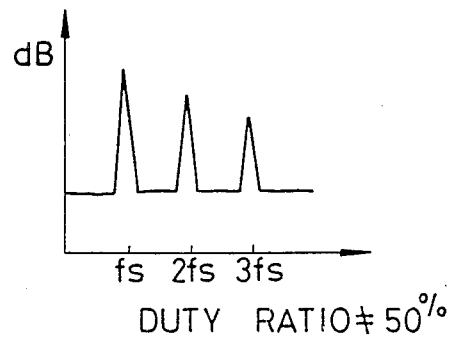

The modulation circuit 60 in FIG. 10 is comprised of a delay circuit 61, a selector 62, a logic circuit 63 and an amplifier 64. A signal shown in FIG. 11(a) is input from a test signal generator 80 to the delay circuit 61 through a switch circuit 80. In the foregoing description, signals of period T and signals of period 2T have been alternately output, whereas FIG. 11 shows a signal of a single period for the sake of convenience. The delay circuit 61 delays the signal of FIG. 11(a) as shown in FIGS. 11(b), (c) and (d) and inputs it to the selector 62. The selector 62 selects two signals from among the signals from the switch circuit 80 and the delay circuit 61 in response to the signal from the microcomputer 50. The logic circuit 63 selects one of the logic sum and the logic product of the two signals from the selector 62 in response to the output from the microcomputer 50 and outputs it to the amplifier 64. The microcomputer 50 judges how the duty ratio of the signal written into the disc 100 should be adjusted on the basis of the output of the window comparator. When the duty ratio is to be increased, the logic sum of two suitable signals is taken from the signal as shown in FIG. 11, and when the duty ratio is to be decreased, the logic product of the two suitable signals is taken.

In short, the present invention is designed such that the difference between amplitude levels dependent upon the frequencies of reproduced information signals are detected above and below the amplitude center level and the relative magnitudes are determined. The present invention can be applied not only to a rotating disc-like medium but also to a rectilinearly moving card-like medium, and is not limited in the shape of the medium.

Now, there is a case where it is impossible in the circuit to strictly detect a recording power which is h1=h2 as shown in the previous embodiment even if an attempt is made to detect an optimum recording power free of secondary distortion. In such case, actually, it is judged that a recording power which is in the range of $$|h1-h2|<\alpha$$

relative to a predetermined value $\alpha$ ($\alpha$ being positive) is proper.

Therefore, where the initial value of the recording power is excessively great or excessively small when an optimum recording power is to be detected on the basis of the detection of secondary distortion, if the recording power is corrected so that $|h1-h2|$ may be within the predetermined value $\alpha$, it will be judged that the recording power has become optimum at the boundary $$|h1-h2|=\alpha$$

whereat the recording power is always judged as proper.

So, to increase the detection accuracy of secondary distortion, the predetermined value $\alpha$ must be made small, but if the predetermined value $\alpha$ is made too small, there may arise the problem that detection becomes difficult.

Figure 14:
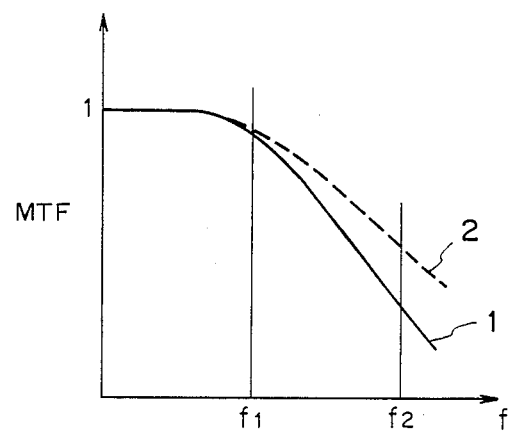
FIG. 14 is a graph showing the MTF frequency characteristics of a reading optical system according to an improved embodiment of the present invention.

Also, due to the difference in the resolving ability of the optical system, the MTF frequency characteristic changes as indicated by (1) and (2) in FIG. 14 and thus, the amplitude difference of a signal of a low frequency f1 and the amplitude difference of a signal of a high frequency f2 differ from each other.

Figures 15A, 15B:
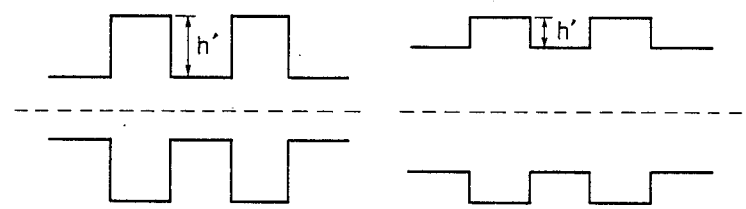
FIGS. 15A and 15B show the waveforms of envelope detection outputs conforming to the MTF frequency characteristics of FIG. 14.
Figure 16:
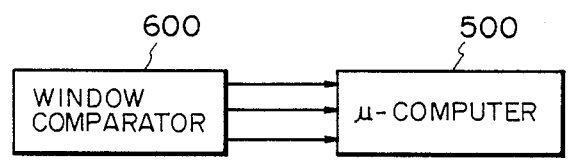
FIG. 16 is a block diagram showing a portion of the construction of the improved embodiment of the present invention.

For example, when the MTF frequency characteristic is (1) of FIG. 14, the outputs of the upper and lower envelope detecting circuits 3a and 3b shown in FIG. 2 become such as shown in FIG. 15A, and on, the other hand, when the MTF frequency characteristic is (2) of FIG. 14, the outputs of the upper and lower envelope detecting circuits 3a and 3b become such as shown in FIG. 15B. That is, the amplitude difference h is varied by the MTF frequency characteristic of the optical system.

Therefore, if the amplitude h becomes small relative to the predetermined value $\alpha$ which is indicative of the detection accuracy of secondary distortion, when $$|h1-h2|=\alpha$$

the asymmetry of the waveform of the upper envelope detection output and the waveform of the lower envelope detection output becomes great and the detection accuracy of secondary distortion becomes worse.

Accordingly, there is the possibility of a problem in that the detection accuracy of secondary distortion is changed by the difference in the resolving power of the optical system.

The principle of an improved embodiment of the present invention which solves the above-noted problem will be described hereinafter.

In an apparatus according to the improved embodiment of the present invention, each recording power for which the difference between the outputs h1 and h2 of two amplitude difference detecting circuits when the recording power is varied is at the boundary (upper limit and lower limit) of the range $$|h1-h2|<\alpha,$$

is detected, i.e., each recording power when the output difference (h1−h2) coincides with a value $+\alpha$ and a value $-\alpha$, is detected, and a recording power of the average value which is the center of the recording power which provides these $+\alpha$ and $-\alpha$ is detected as the optimum recording power.

Specifically, the recording power is varied to thereby detect a recording power A (upper limit) which is ti $h1-h2=-\alpha$ and a recording power B (lower limit) which is $$h1-h2=+\alpha,$$

and the average recording power which is $$(A+B)/2$$

is found as the optimum recording power.

In the detection of such optimum recording power, it is not necessary to set the predetermined value $\alpha$ strictly to a small value and therefore, the burden of the circuit becomes small and also, without being affected by the irregularity of the optical system, an optimum recording power which always minimizes secondary distortion, i.e., an optimum recording power which is $$h1-h2|°0,$$

can be detected and set.

The construction of the improved embodiment of the present invention will now be described. The differences between the previous embodiment and the improved embodiment lie in a window comparator 600 and a $\mu$-computer 500, and in the other points, the construction of the improved embodiment is the same as that of FIG. 1.

The window comparator 600 effects the following three judgements and outputs signals indicative of the results of these judgements to the $\mu$-computer 500.

$$h1-h2<\alpha \tag{1}$$

$$h1-h2>-\alpha \tag{2}$$

$$|h1-h2|<\alpha \tag{3}$$

Figure 17:
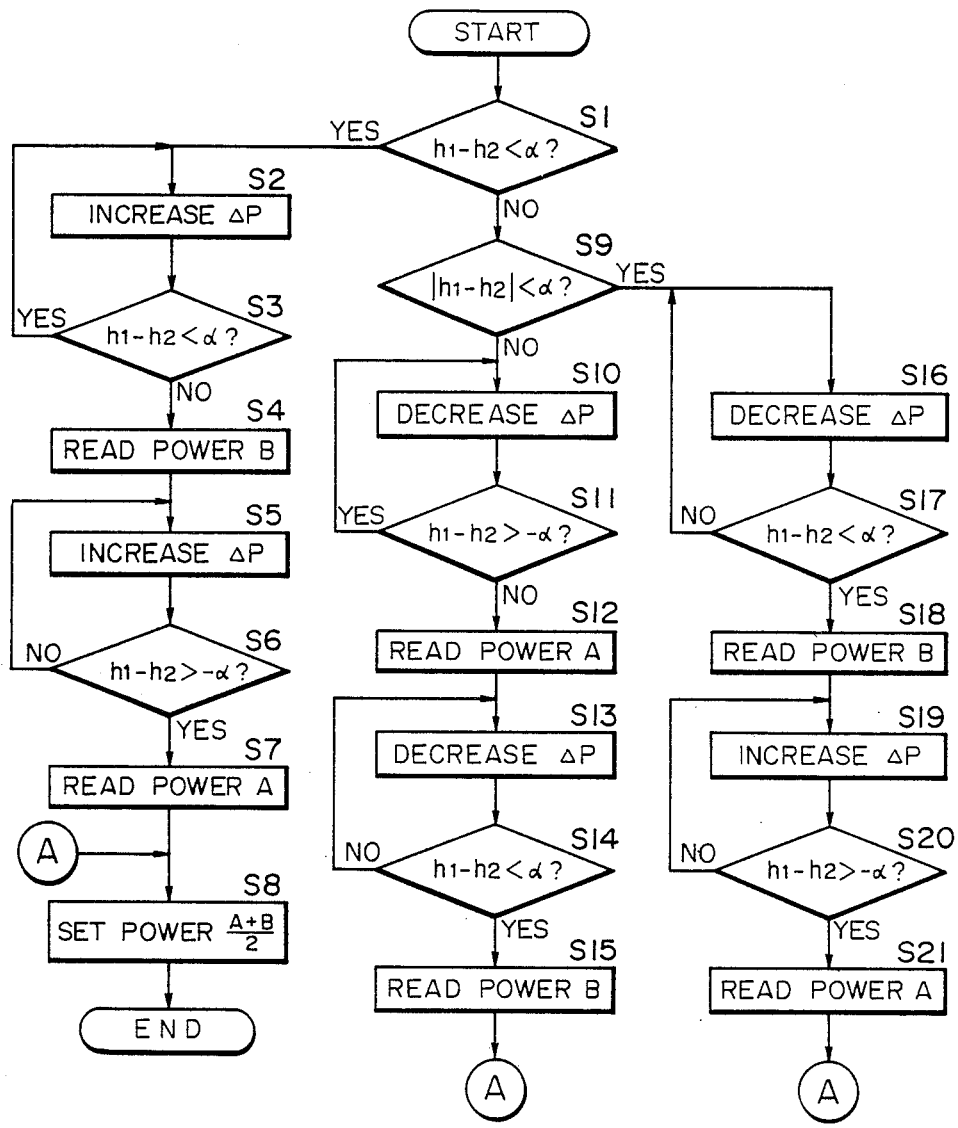
FIG. 17 is a flow chart showing the operation of the improved embodiment of the present invention.

The $\mu$-computer 500 operates on the basis of the signals from the window comparator 600 in accordance with a flow chart shown in FIG. 17. At that time, the $\mu$-computer 500 effects a judgement as to whether the electric power supplied to the laser source is proper, as shown in FIG. 18.

Figure 18:
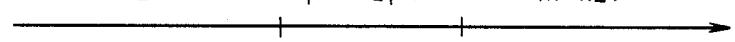
FIG. 18 illustrates the principle of the improved embodiment of the present invention.

In FIG. 18, there are shown conditional formulas conforming to the above-mentioned three judgements. The supplied electric power when $h1-h2<\alpha$ (1) is satisfied is lower than the supplied electric power when $|h1-h2|<\alpha$ (3) is satisfied, and the supplied electric power when $h1-h2>-\alpha$ (2) is satisfied is higher than the supplied electric power when the condition (3) is satisfied.

FIG. 17 will now be described.

At step S1, judgement according to the judgement (1) is effected on the basis of the signal from the window comparator 600. If the state is of the judgement (1), shift is made to step S2, where the $\mu$-computer 500 causes the modulation circuit 600 to increase the electric power supplied to the laser source by a predetermined value $\Delta P$. At step S3, the judgement (1) is again effected, and the electric power is increased at step S2 until the judgement (1) is negated. When at step S3, the judgement (1) is negated, at step S4, the then value of the electric power is read as B. At step S5, as at step S2, the electric power is increased by $\Delta P$. At step S6, the judgement (2) is effected, and if this judgement is negated, return is made to step S5, and if the judgement (2) is affirmed, shift is made to step S7, where the then value of the electric power is read as A. At step S8, the average value of the read values A and B of the electric power is calculated, and the electric power supplied to the laser source is set to $A+B/2$, thus completing the process of optimizing the electric power supplied to the laser source.

At step S9, the judgement (3) is effected, and if this judgement is affirmed, shift is made to step S16, and if this judgement is negated, shift is made to step S10.

At the step S10, the electric power is decreased by the predetermined value $\Delta P$, and at step S11, the judgement (2) is effected, and if the judgement (2) is negated, shift is made to step S12, where the value of the electric power is read as A. At step S13, as at step S10, the electric power is decreased by the predetermined value $\Delta P$, and at step S14, the judgement (1) is effected. If this judgement is affirmed, shift is made to step S15, where the value of the electric power is read as B, and shift is made to step S8, and the process of optimizing the supplied electric power is completed.

At step S16, the electric power is decreased by the predetermined value $\Delta P$, and at step S17, the judgement (1) is effected, and if the judgement is affirmed, at step S18, the value of the electric power is read as B. At step S19, the electric power is increased by the predetermined value ΔP, and at step S20, the judgement (2) is effected, and if this judgement is affirmed, shift is made to step S21, where the value of the electric power is read as a, and shift is made to step S8, and the process of optimizing the supplied electric power is completed.

We claim:

1. An apparatus for recording information on an optical type recording medium, including:
   (a) generating means for alternately generating a binary signal of a first frequency and a binary signal of second frequency lower than said first frequency;
   (b) means for applying a radiation to said medium and writing the binary signals of said first frequency and said second frequency into said medium;
   (c) converting means for reproducing the binary signals of said first frequency and said second frequency written into said medium and converting them to electrical signals;
   (d) AC amplifying means for AC-amplifying said electrical signals;
   (e) detecting means for detecting the difference between the amplitude of the output of said AC amplifying means of a level higher than a reference level which corresponds to said first frequency and the amplitude of the output of said AC amplifying means of a level lower than said reference level which corresponds to said first frequency and outputting a detection signal; and
   (f) means responsive to said detection signal to control the intensity of the radiation applied to said medium by said writing means.

2. An apparatus according to claim 1, wherein said control means is responsive to said detection signal to control the intensity of the radiation applied to said medium by said writing means so that the amplitude of the output of said AC amplifying means of the level higher than said reference level and the amplitude of the output of said AC amplifying means of the level lower than said reference level become substantially equal to each other.

3. An apparatus according to claim 2, wherein said reference level is substantially coincident with the center of the amplitude of the output of said AC amplifying means which corresponds to said second frequency.

4. An apparatus according to claim 3, wherein said detecting means includes first envelope detecting means for producing a first envelope signal indicative of the envelope of the output of said AC amplifying means of the level higher than said reference level, and second envelope detecting means for producing a second envelope signal indicative of the envelope of the output of said AC amplifying means of the level lower than said reference level.

5. An apparatus according to claim 4, wherein said detecting means includes filter means for cutting more than the predetermined frequencies of said first envelope signal and said second envelope signal, and means for comparing the amplitudes of said first envelope signal and said second envelope signal passed through said filter means.

6. An apparatus according to claim 5, further including test signal generating means for alternately generating a binary signal of said first frequency and a binary signal of said second frequency at a predetermined period, information signal generating means for generating a signal to be written into said medium after the control of said writing means by said control means, and selecting means for transmitting one of the output from said test signal generating means and the output of said information signal generating means to said writing means.

7. An apparatus for recording information on an optical type recording medium, including:
   (a) generating means for alternately generating a binary signal of a first frequency and a binary signal of a second frequency lower than said first frequency at a predetermined period;
   (b) means for applying radiation to said medium and writing the binary signals of said first frequency and said second frequency into said medium;
   (c) converting means for reproducing the binary signals of said first frequency and said second frequency written into said medium and converting them to electrical signals;
   (d) AC amplifying means for AC-amplifying said electrical signals;
   (e) detecting means for detecting the difference between the amplitude of the output of said AC amplifying means of a level higher than a reference level which corresponds to said first frequency and the amplitude of the output of said AC amplifying means of a level lower than said reference level which corresponds to said first frequency and outputting a detection signal; and
   (f) control means responsive to said detection signal to control the duty ratio of the binary signals of said first frequency and said second frequency generated by said generating means.

8. An apparatus according to claim 7, wherein said control means is responsive to said detection signal to control the duty ratio of the binary signals of said first frequency and said second frequency so that the amplitude of the output of said AC amplifying means of the level higher than said reference level and the amplitude of the output of said AC amplifying means of the level lower than said reference level become substantially equal to each other.

9. An apparatus according to claim 8, wherein said reference level is substantially coincident with the center of the amplitude of the output of said AC amplifying means which corresponds to said second frequency.

10. An apparatus according to claim 9, wherein said detecting means includes first envelope detecting means for producing a first envelope signal indicative of the envelope of the output of said AC amplifying means of the level higher than said reference level, and second envelope detecting means for producing a second envelope signal indicative of the envelope of the output of said AC amplifying means of the level lower than said reference level.

11. An apparatus for recording information on an optical type recording medium, including:
   (a) means for applying radiation to said medium so that a binary signal of a first frequency and a binary signal of a second frequency differing from said first frequency are alternately written into said medium;
   (b) converting means for reproducing the binary signals of said first frequency and said second frequency written into said medium and converting them to electrical signals;
   (c) AC amplifying means for AC-amplifying said electrical signals;
   (d) detecting means for detecting the difference between the amplitude of the output of said AC amplifying means of a level higher than a reference level which corresponds to said first frequency and the amplitude of the output of said AC amplifying means of a level lower than said reference level which corresponds to said first frequency and outputting a detection signal; and (e) means responsive to said detection signal to control said writing means.

12. An apparatus according to claim 11, wherein said second frequency is lower than said first frequency.

13. An apparatus according to claim 12, wherein said detecting means includes first envelope detecting means for producing a first envelope signal indicative of the envelope of the output of said AC amplifying means of the level higher than said reference level, and second envelope detecting means for producing a second envelope signal indicative of the envelope of the output of said AC amplifying means of the level lower than said reference level.

14. An apparatus including:
(a) converting means for reproducing binary signals from a medium on which binary signals of a first frequency and binary signals of a second frequency differing from said first frequency are recorded alternately and converting them to electrical signals;
(b) AC amplifying means for AC-amplifying said electrical signals; and
(c) secondary distortion detecting means for detecting the difference between the amplitude of the output of said AC amplifying means of a level higher than a reference level and the amplitude of the output of said AC amplifying means of a level lower than said reference level and detecting the secondary distortion of said binary signals recorded on said medium.

15. An apparatus according to claim 14, wherein said secondary distortion detecting means detects the presence and the polarity of the secondary distortions of said binary signals recorded on said medium.

16. An apparatus according to claim 15, wherein said reference level is substantially coincident with the center of the amplitude of the output of said AC amplifying means which corresponds to said second frequency.

17. An apparatus according to claim 16, wherein said detecting means includes first envelope detecting means for producing a first envelope signal indicative of the envelope of the output of said AC amplifying means of the level higher than said reference level, and second envelope detecting means for producing a second envelope signal indicative of the envelope of the output of said AC amplifying means of the level lower than said reference level.

18. An apparatus including:
(a) converting means for reproducing binary signals from a medium on which binary signals of a first frequency and binary signals of a second frequency differing from said first frequency are recorded alternately and converting them to electrical signals;
(b) AC amplifying means for AC-amplifying said electrical signals; and
(c) secondary distortion detecting means for detecting a variation in the waveform of the output of said AC amplifying means corresponding to the binary signals of said first frequency relative to the waveform of the output of said AC amplifying means corresponding to the binary signals of said second frequency and detecting the secondary distortion of said binary signals recorded on said medium.

19. An apparatus according to claim 18, wherein said second frequency is lower than said first frequency.

20. An apparatus for recording information on an optical type recording medium including:
(a) generating means for alternately generating a binary signal of a first frequency and a binary signal of a second frequency lower than said first frequency;
(b) radiation applying means for applying radiation to said medium and writing the binary signals of said first frequency and said second frequency into said medium;
(c) converting means for reproducing the binary signals of said first frequency and said second frequency written into said medium and converting them to electrical signal;
(d) AC amplifying means for AC-amplifying said electrical signals;
(e) detecting means for detecting the difference between the amplitude of the output of said AC amplifying means of a level higher than a reference level and the amplitude of the output of said AC amplifying means of a level lower than said reference level, and for outputting a detection signal;
(f) comparing means responsive to said detection signal to compare the difference detected by said detecting means with a first and a second comparison level, and outputting a comparison signal indicative of the relationship of the difference detected by said detecting means with said first and said second comparison levels; and
(g) control means for adjusting power to said radiation applying means to cause said radiation applying means to change the intensity of radiation, said control means storing therein a first value of power which makes the relationship that the difference detected by said detecting means is substantially equal to said first comparison level, and storing therein a second value which makes the relationship that the difference detected by said detecting means is substantially equal to said second comparison level, said control means adjusting power to said radiation applying means on the basis of said first and second values.

21. An apparatus according to claim 20, wherein said control means calculates an average of said first and said second value and adjusts power to said radiation applying means so that the value of power to said radiation applying means is substantially equal to said calculated average.

22. An apparatus according to claim 20, wherein said detecting means includes first envelope detecting means for producing a first envelope signal indicative of the envelope of the output of said AC amplifying means of the level higher than said reference level, and second envelope detecting means for producing a second envelope signal indicative of the envelope of the output of said AC amplifying means of the level lower than said reference level.

23. An apparatus according to claim 22, wherein said detecting means includes filter means for cutting more than the predetermined frequencies of said first envelope signal and said second envelope signal, and means for comparing the amplitudes of said first envelope signal and said second envelope signal passed through said filter means.

24. An apparatus according to claim 23, further including test signal generating means for alternately generating a binary signal of said first frequency and a binary signal of said second frequency at a predetermined period, information signal generating means for generating a signal to be written into said medium after the control of said writing means by said control means, and selecting means for transmitting one of the output from said test signal generating means and the output of said information signal generating means to said writing means.

25. A method for recording information on an optical type recording medium, comprising the steps of:

(a) alternately generating a binary signal of a first frequency and binary signal of a second frequency lower than said first frequency;
(b) applying radiation to said medium and writing the binary signals of said first frequency and said second frequency into said medium;
(c) reproducing the binary signals of said first frequency and said second frequency written into said medium and converting them to electrical signals;
(d) AC-amplifying said electrical signals;
(e) detecting the difference between the amplitude of the output of AC amplifying means of a level higher than a reference level and the amplitude of the output of said AC amplifying means of a level lower than said reference level; and
(f) controlling the intensity of the radiation applied to said medium on the basis of the detected difference.

* * * * *